United States Patent [19]
Hayato

[11] Patent Number: 6,081,692
[45] Date of Patent: *Jun. 27, 2000

[54] SELECTIVE CALLING COMMUNICATION SYSTEM AND SELECTIVE CALLING RECEIVER

[75] Inventor: Yasuo Hayato, Chiba, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,223

[22] Filed: Jun. 20, 1996

[30] Foreign Application Priority Data

Jun. 29, 1995 [JP] Japan .................................. 7-186459

[51] Int. Cl.$^7$ .................................................. H04B 1/00
[52] U.S. Cl. ......................................... 455/31.2; 455/31.1
[58] Field of Search ....................... 340/825.47; 379/209; 455/31.1, 31.2, 38.1, 38.2, 38.4

[56] References Cited

U.S. PATENT DOCUMENTS

| | | | |
|---|---|---|---|
| 4,266,093 | 5/1981 | Bauer | 381/19 |
| 4,477,807 | 10/1984 | Nakajima et al. | 340/825.44 |
| 4,825,193 | 4/1989 | Siwiak et al. | 340/825.44 |
| 4,835,777 | 5/1989 | DeLuca et al. | 340/825.44 |
| 5,128,979 | 7/1992 | Reich et al. | 379/40 |
| 5,153,903 | 10/1992 | Eastmond et al. | 455/458 |
| 5,173,688 | 12/1992 | DeLucaa et al. | 340/835.44 |
| 5,185,604 | 2/1993 | Nepple et al. | 340/825.44 |
| 5,347,269 | 9/1994 | Van Den Heuvel | 340/825.44 |
| 5,384,565 | 1/1995 | Cannon | 340/825.44 |
| 5,436,620 | 7/1995 | Ide | 340/825.44 |
| 5,533,100 | 7/1996 | Bass et al. | 379/209 |
| 5,546,078 | 8/1996 | Motohashi et al. | 340/825.44 |
| 5,572,197 | 11/1996 | Matsumoto | 340/825.44 |
| 5,627,875 | 5/1997 | Kapsales | 455/414 |
| 5,638,432 | 6/1997 | Wille et al. | 379/121 |
| 5,673,256 | 9/1997 | Maine | 455/427 |
| 5,764,157 | 6/1998 | Kudoh | 340/835.44 |

FOREIGN PATENT DOCUMENTS

| | | | |
|---|---|---|---|
| H4-253428 | 1/1991 | Japan | H04B 7/26 |
| H7-288482 | 10/1995 | Japan | H04B 1/16 |
| H8-316860 | 11/1996 | Japan | H04B 1/16 |
| H9-018920 | 1/1997 | Japan | H04Q 7/14 |

*Primary Examiner*—Reinhard J. Eisenzopf
*Assistant Examiner*—Makoto Aoki
*Attorney, Agent, or Firm*—Jay H. Maioli

[57] ABSTRACT

In a selective calling communication system, the number of times a paging signal is transmitted and a paging signal transmission interval can be changed in response to a request of a calling party, and the paging signal is transmitted the changed number of times and/or at changed intervals, so that the paging signal can be received at a higher probability than before, thus making it possible to realize a selective calling communication system which can improve the reliability of reception as compared with conventional systems.

5 Claims, 3 Drawing Sheets

SELECTIVE CALLING COMMUNICATION SYSTEM AND SELECTIVE CALLING RECEIVER

BACKGROUND OF THE INVENTION

1. Field of the Invention

The present invention relates to a selective calling communication system and a selective calling receiver, and is applicable to, for example, a paging system utilizing FM multiplex broadcasting.

2. Description of the Related Art

Conventionally, a selective calling communication system referred to as a "paging system" has been used to call a person who has a receiver terminal unit. When a receiver terminal unit is called in this paging system, a calling party first inputs the terminal number of a desired receiver terminal unit from a predetermined telephone and then inputs information such as a message or the like also from the telephone. The input information is once transmitted to a central base station, which is a provider of communication services, through a common telephone network. The central base station, upon receiving the information, instructs an associated local base station to call the receiver terminal unit. The local base station, in response to this instruction, transmits a paging signal and the message, for example, using radio waves in a VHF band to call the receiver terminal unit. The receiver terminal unit receives the paging signal, generates call receiving sound, and displays the information such as the received message or the like on a liquid crystal display. In this way, the person having the receiver terminal unit recognizes that he is being called and can know information such as the message or the like from the calling party.

In addition to the conventional paging system mentioned above, a paging system utilizing FM multiplex broadcasting has been proposed in recent years. This system multiplexes a paging signal for calling a receiver terminal unit and information such as a message or the like on radio waves for transmitting FM radio broadcasting. Thus, the system advantageously utilizes existing transmission facilities which have been built for the FM radio broadcasting without any modification. For multiplexing the paging signal and information such as a message or the like in this paging system, multiplexing scheme such as a DARC (Data Radio Channel) scheme, a receptor scheme, or the like, is employed by way of example.

It should be noted that this kind of paging system is basically identical to conventional paging systems utilizing dedicated radio waves except that radio waves for FM radio broadcasting are employed.

In these paging systems, certain countermeasures must be taken for improving the reliability of reception. Particularly, since the paging system utilizing FM multiplex broadcasting has a less number of base stations than the paging systems utilizing dedicated radio waves, such countermeasures are indispensable.

A method of improving the reliability of reception involves, for example, calling a receiver terminal unit twice within a predetermined time interval, continually calling a receiver terminal unit for three hours at intervals of 15 minutes, or the like.

However, the twice-call method has an inconvenience that if a receiver terminal unit is in a radio wave inaccessible place, such as in a tunnel, while a paging signal is transmitted twice, the receiver terminal unit cannot receive the paging signal. The three-hour call method, in turn, has an inconvenience that as a receiver terminal unit receives the same paging signal a plurality of times, a time stamp is sequentially updated in response to repetitively received messages, thereby missing the time stamp generated when the paging signal was first received.

SUMMARY OF THE INVENTION

In view of the foregoing, an object of the present invention is to provide a selective calling communication system and a selective calling receiver which are capable of improving the reliability of reception as compared with conventional paging systems.

The foregoing object and other objects of the present invention have been achieved by the provision of a selective calling communication system comprising: a base station for transmitting a paging signal which includes specific information such as the desired number of transmission times, and/or at a desired transmission time interval set by a calling party; and a plurality of selective calling receivers, at least, one of the receivers for receiving the paging signal and informing a user of being called.

Further, in the present invention, a selective calling receiver for receiving a paging signal transmitted from a base station and informing a user of being called, comprises: a display means for displaying the specific information included in the paging signal and a reception time when the paging signal is received; a mode switch means for setting whether updating a reception time to be displayed on the display means when the paging signal is received again; and a control means for controlling updating of the reception time in accordance with the setting of the mode switch means.

Since the base station changes the number of times the paging signal is transmitted or a paging signal transmission time interval in response to a request from a calling party and transmits the paging signal a changed number of times at changed time intervals, the receiver terminal unit can receive the paging signal with a higher probability than conventional paging systems even in a place to which radio waves are not easily accessible.

Also, if the receiver terminal unit is set into a mode, in which reception time is not updated, by the mode setting means, the reception time recorded when the paging signal was first received is continuously displayed on the display means, thereby making it possible to avoid a situation in which the reception time recorded when the paging signal was first receives is lost, as is the case of conventional paging systems.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
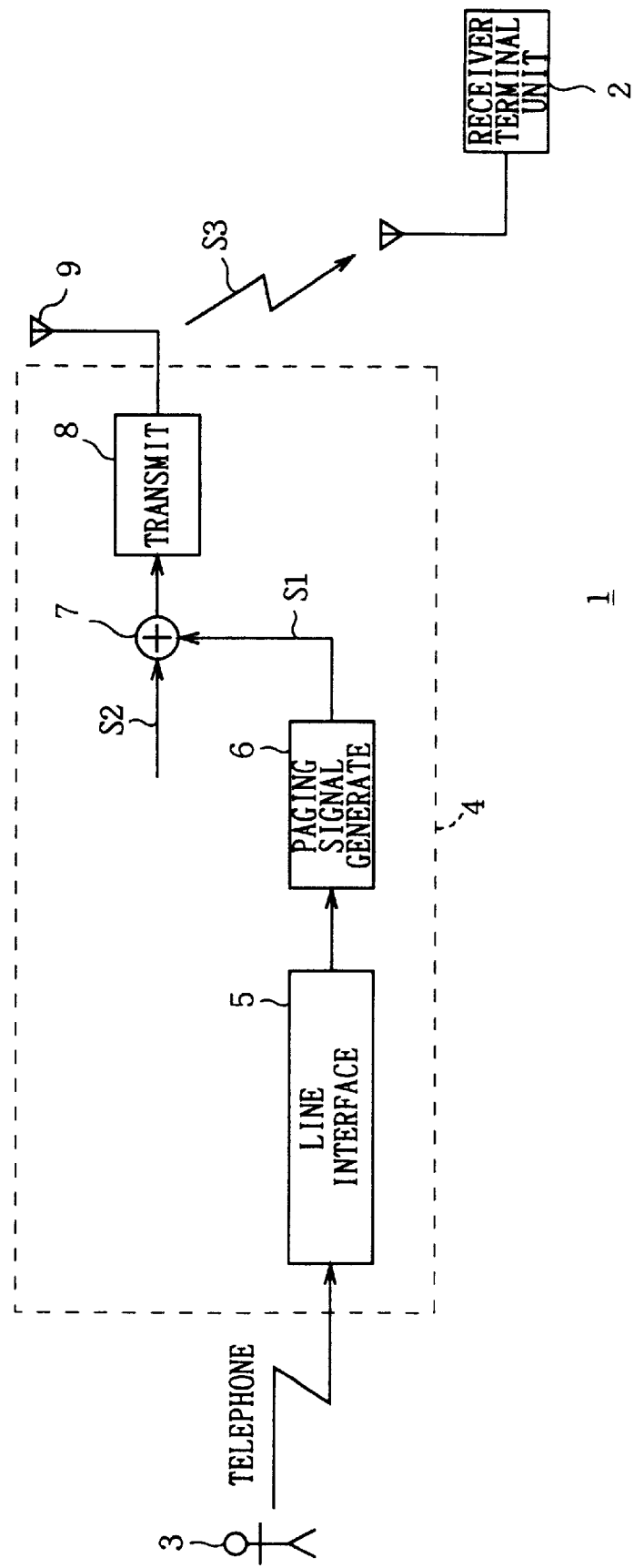
FIG. 1 is a block diagram illustrating a paging system utilizing FM multiplex broadcasting according to one embodiment of the present invention.

Preferred embodiments of the present invention will be described with reference to the accompanying drawings:

Referring first to FIG. 1, a paging system utilizing FM multiplex broadcasting, to which the present invention is applied, is generally designated by reference numeral 1. The paging system 1 is designed to permit the user a freely set to number of times a receiver terminal unit is called and a calling time interval. When a receiver terminal unit 2 is called in the paging system 1, a calling party 3 first makes a call through a common telephone network to a paging service center 4, which represents a communication service provider, to input information including the terminal number of the desired receiver terminal unit 2, a message to be transmitted, the number of times the receiver terminal unit 2 is to be called, a calling time interval, and so on through a keyboard on a terminal unit of the calling party 3.

In the paging service center 4, the information is supplied to a paging signal generator unit 6 through a line interface unit 5. The paging signal generator unit 6 generates a paging signal for calling the receiver terminal unit 2 based on the supplied information as well as converts the calling signal and the information such as a message or the like into a signal format, for example, in accordance with the DARC scheme such that these signal and information can be multiplexed on primarily transmitted broadcast signals. In this way, a paging signal S1 is generated. The paging signal S1 is supplied to an adder 7 and multiplexed on a broadcast signal S2, which is primarily transmitted as FM radio broadcasting, and then supplied to a transmitter unit 8.

The transmitter unit 8 FM (Frequency Modulation) modulates a predetermined carrier based on the multiplex signal including the paging signal S1 multiplexed on the broadcast signal S2 to generates an FM multiplex signal S3, and amplifies the FM multiplex signal S3 to predetermined power. The amplified FM multiplex signal S3 is sent to an antenna 9 and emitted therefrom.

It should be noted that the paging signal S1 generated by the paging signal generator unit 6 is output therefrom in accordance with a time interval and the number of times of calling set by the calling party 3. Specifically, if the calling party 3 sets the time interval to 10 minutes and the number of times of calling to five, the paging signal S1 is output five times at intervals of 10 minutes.

The receiver terminal unit 2, upon receiving the FM multiplex signal S3, detects the calling, generates call receiving sound, and displays information such as a message or the like on a liquid crystal display. This lets the owner of the receiver terminal unit 2 know that he has been called and that a message is sent from the calling party 3.

In this event, since the paging signal S1 is output a plurality of times in accordance with the setting of the calling party 3 as described above, the receiver terminal unit 2 receives the same FM multiplex signal S3 the plurality of times if its receiving condition is good. Also, since the paging signal S1 is output a plurality of times, the receiver terminal unit 2 can receive the FM multiplex signal S3 any of the plurality of times even if its receiving condition is not satisfactory.

Figure 2:
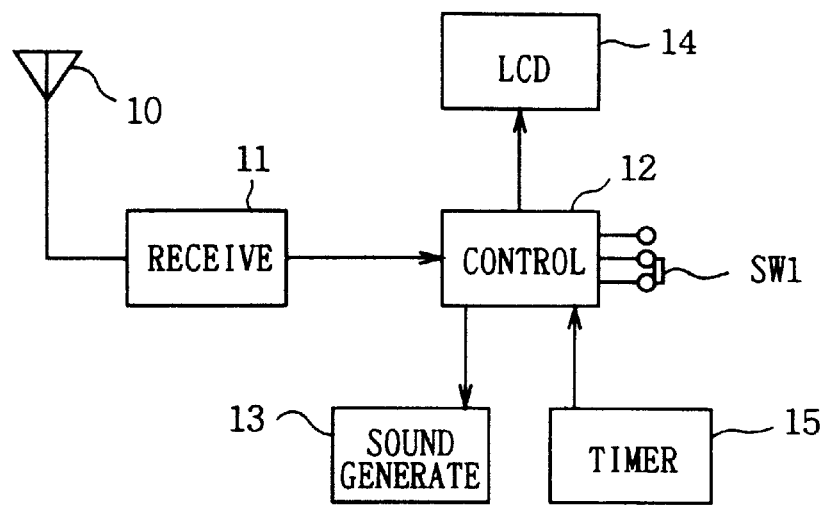
FIG. 2 is a block diagram illustrating the configuration of a receiver terminal unit.

Now, the receiver terminal unit 2 will be described in detail. As illustrated in FIG. 2, the receiver terminal unit 2 receives the FM multiplex signal S3 by an antenna 10, and supplies the received FM multiplex signal S3 to a receiver unit 11. The receiver unit 11 amplifies the received FM multiplex signal S3 and performs predetermined signal processing to extract the paging signal from the FM multiplex signal S3. Then, the receiver unit 11 restores the paging signal and information such as a message or the like from the paging signal in the DARC signal format. The restored calling signal and information such as a message or the like are supplied to a control unit 12 which is based on, for example, a microcomputer.

The control unit 12 detects by the reception of the paging signal that the associated receiver terminal unit 2 is being called, operates a sound generator 13 to generate call receiving sound, and displays a received message on a liquid crystal display (LCD) 14. In this event, the control unit 12 displays on the liquid crystal display 14, together with the message, a time stamp indicative of the reception time recorded when the paging signal was received based on reference time provided from a timer 15.

When the control unit 12 detects the same paging signal a plurality of times, the control unit 12 displays on the LCD 14, a predetermined symbol for indicating that the same message has been repetitively received, for example, "DUP" taken from initial letters of "DUPLICATION" or any other symbol as a duplication mark.

In general, conventional receiver terminal units, when receiving the same message more than one time, display a mark indicative of a duplicated message and sequentially updates a time stamp. However, the receiver terminal unit 2 of this embodiment is provided with a mode switch SW1 which can be set in accordance with a request of the user as to whether or not the time stamp should be updated.

Information on the mode switch SW1 is fetched into the control unit 12, so that the control unit 12 can recognize which mode the user requests. When the user sets the mode switch SW1 to "Update", the control unit 12 sequentially updates the time stamp as it receives the same message, and displays the updated time stamp on the liquid crystal display 14. On the other hand, when the user sets the mode switch SW1 to "Not Update", the control unit 12 does not update the time stamp when it receives the same message, and continuously displays the time stamp recorded when the message was first received, without any change, on the liquid crystal display 14.

Figure 3A:
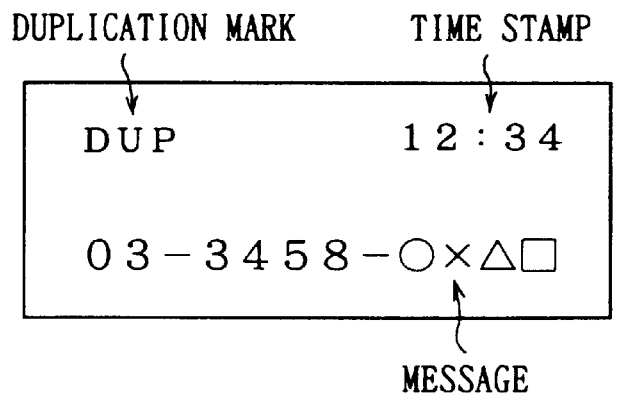
FIGS. 3A and 3B are schematic diagrams illustrating examples of images on a liquid crystal display arranged in the receiver terminal unit.
Figure 3B:
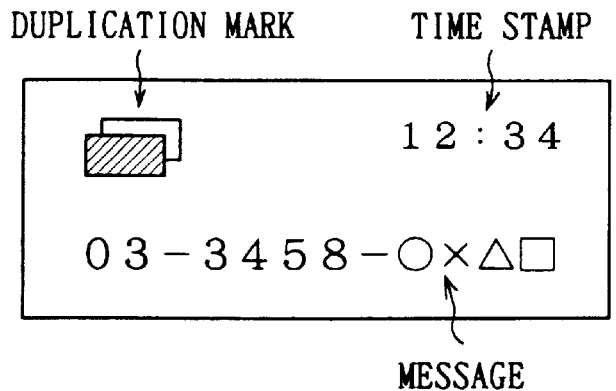

Now, some examples of displayed images on the liquid crystal display 14 will be explained with reference to FIGS. 3A, 3B. As illustrated in FIG. 3A, if a received message is, for example, the telephone number of a calling party, the telephone number is displayed in a message display region reserved in a lower portion of the liquid crystal display 14. The time stamp, in turn, is displayed in a time stamp display region reserved in an upper right portion of the liquid crystal display 14 in Arabic numerals. The duplication mark such as "DUP" or the like is displayed in a control mark display region reserved in an upper left region of the liquid crystal display 14. The duplication mark may be represented by a symbol as illustrated in FIG. 3B.

Figure 4:
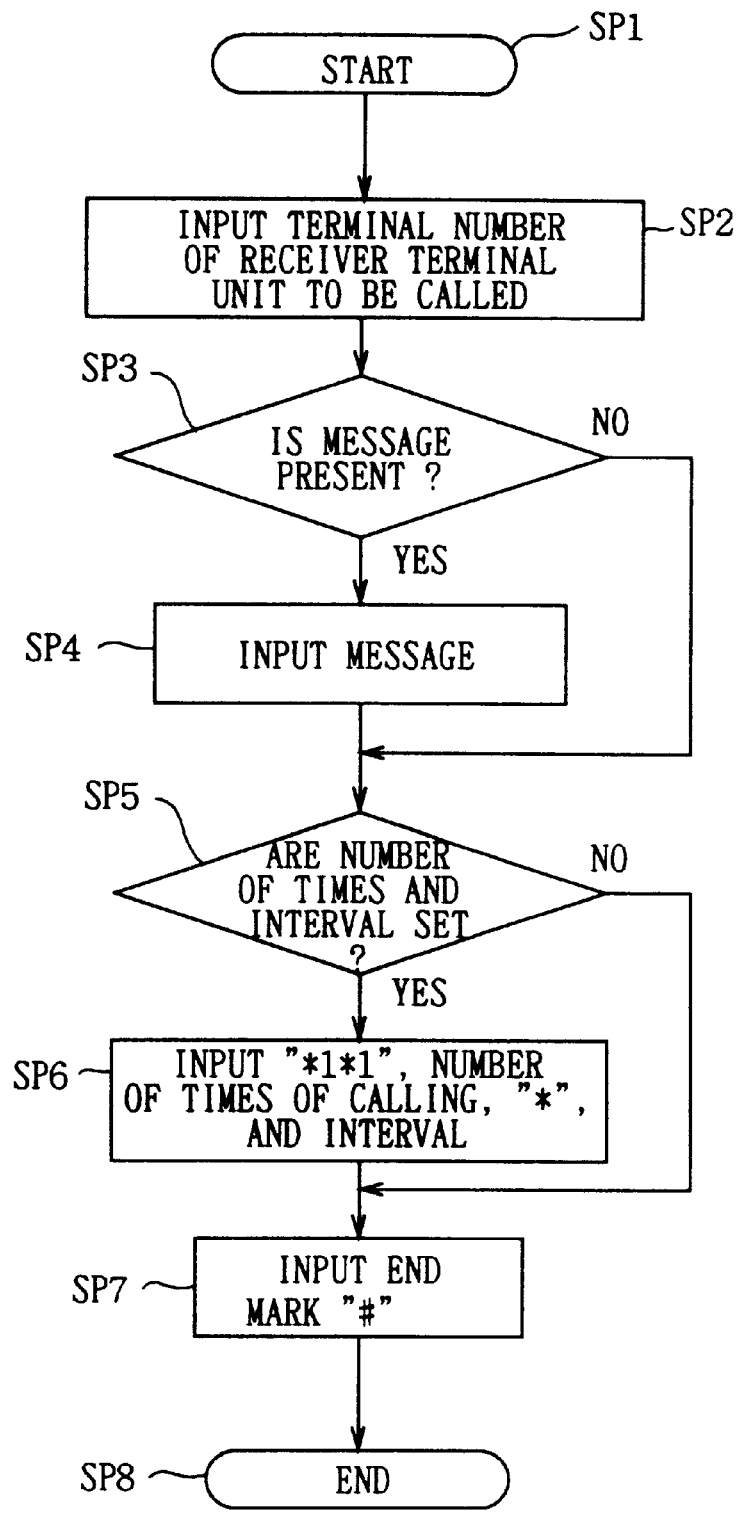
FIG. 4 is a flow chart illustrating a procedure for calling a receiver terminal unit.

Next, a procedure executed when a calling party calls a receiver terminal unit 2 will be specifically described with reference to a flow chart of FIG. 4. As illustrated in FIG. 4, the procedure starts at step SP1, and at step SP2 the calling party inputs the terminal number of the receiver terminal unit 2 to be called from a predetermined telephone. Next, the calling party determines at step SP3 whether or not a message is sent. The procedure proceeds to step SP4 if a message is sent and to step SP5 if no message is sent, bypassing step SP4.

At step SP4, the calling party inputs a message. In this case, the calling party may send his telephone number for notifying how to contact him as a message. In addition, since the alphabet, Japanese characters, Chinese characters and so on can be input by using a matrix table or the like, a short sentence or the like may also be sent as a message. Upon completing the input of the message, the procedure proceeds to step SP5, where the calling party determines whether or not the number of times of calling and a calling time interval are set. The procedure proceeds to step SP6 if they are set and to step SP7 if they are not set, bypassing step SP6.

At step SP6, the calling party first inputs a string "*1*1" as information indicating that the number of times of calling is to be set and inputs the number of times of calling with a numerical value subsequent to this string. Next, the calling party inputs a symbol "*" as information indicating that a calling time interval is set, and inputs a time interval in minute subsequent to the symbol. Next, the procedure proceeds to step SP7, where the calling party inputs a symbol "#" as an end mark indicating that the input operation is completed. Thus, the procedure of calling the receiver terminal unit 2 is terminated.

The information input by the procedure as described above is sent to the paging service center 4 through a common telephone network. The paging service center 4 generates a paging signal S1 for calling the receiver terminal unit 2 based on the information sent thereto, and transmits the paging signal S1 the number of times set by the calling party at intervals also set by the calling party, thus performing a calling operation.

In the paging system 1 according to this embodiment configured as described above, when a receiver terminal unit 2 is to be called, the calling of the receiver terminal unit 2 is made the number of times in accordance with a request of a calling party at intervals also in accordance with the request of the calling party. In this way, even if the receiver terminal unit 2 is in a place such as in a tunnel, to which radio waves are not easily accessible, the paging signal may be transmitted to the receiver terminal unit 2 a more number of times than before, thus making it possible to increase the probability of receiving the paging signal and to improve the reliability of reception. Particularly, if the calling party can predict where the receiver terminal unit 2 to be called will exist, the number of times of calling and a calling time interval can be set in accordance with the predicted location, so that the effect of the present invention is significantly enhanced.

Also, if the number of times of calling is simply increased as is the case of the three-hour call method, useless calling will be made when a receiver terminal unit is in a place where it can easily receive the paging signal, thereby preventing effective utilization of the transmission path. In contrast, the paging system of this embodiment can set the number of times of calling to a smaller value if a receiver terminal unit is supposed to be in a place where the paging signal can be easily received, so that the transmission path can be effectively utilized.

Another feature of this embodiment is that the receiver terminal unit of this embodiment is provided with the mode switch SW1 to set whether or not the time stamp is updated. Thus, if the mode switch SW1 is set so as not to update the time stamp, the receiver terminal unit can reserve the time stamp recorded when the paging signal was first received even if it subsequently receives the paging signal a plurality of times. It is therefore possible to avoid a situation in which the first time stamp is lost as is the case of conventional receiver terminal units.

According to the paging system configured as described above, since the number of times the receiver terminal unit 2 is called and a calling time interval can be changed in accordance with a request of a calling party, the reliability of reception can be improved as compared with conventional paging systems.

While the foregoing embodiment has been described for the case where call receiving sound is generated when a call is detected, the present invention is not limited to this but may operate a vibrator, in stead of generating the call receiving sound, to notify the call with vibration. Further, not limited to these methods, a call may be notified only with a display on a liquid crystal display without generating call receiving sound or vibration.

Also, while in the foregoing embodiments, a variety of information is input from a predetermined telephone, the present invention is not limited to this manner of inputting information. For example, a communications terminal unit such as a portable computer may be connected to a common telephone network to input a variety of information therefrom. In short, any apparatus may be used as long as necessary information can be sent to the paging service center 4 therefrom.

Further, while in the foregoing embodiment, the number of times of calling and a calling time interval are changed in response to a request of a calling party, the present invention is not limited to changing these two parameters. Alternatively, the present invention may be modified such that either the number of times of calling or a calling time interval may be changed.

Further, while the foregoing embodiment has been described in connection with the paging service center 4 from which the paging signal is transmitted, the present invention is not limited to the use of the paging service center for transmitting the paging signal. Alternatively, another base station may be provided in addition to the paging service center 4 such that the paging signal is transmitted from this base station. In short, any facility may be used as long as the paging signal can be transmitted in response to a request from a calling party through predetermined radio waves.

Further, while in the foregoing embodiment, a string "*1*1" is input as information indicative of the setting of the number of times of calling, a symbol "*" is input as information indicative of the setting of a call time interval, and a symbol "#" is input as information indicative of the completion of input, the present invention is not limited to these particular forms of indication. Alternatively, any other data may be used as similar information if the service provider has previously defined.

Further, the foregoing embodiment has been described in connection with the paging system 1 utilizing FM multiplex broadcasting to which the present invention is applied. The present invention however is not limited to this type of paging system but may also be applied to a paging system which utilizes dedicated radio waves to call a receiver terminal unit. Stated another way, the present invention can be widely applied to radio calling systems which use any radio waves to call receiver terminal units.

According to the present invention as described above, the number of times a paging signal is transmitted and a paging signal transmission time interval can be changed in response to a request of a calling party, and the paging signal is transmitted a changed number of times at changed intervals, so that the paging signal can be received at a higher probability than before, thus making it possible to realize a radio calling system which can improve the reliability of reception as compared with conventional systems.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A selective calling communication system in which a calling party places a paging call to a user of a target wireless terminal, comprising:

means operable by said calling party for setting a desired number of transmission attempts to connect said paging call to said user and for setting a desired transmission time interval between successive attempts to connect;

a base station for transmitting a paging signal including specific information for said desired number of transmission attempts at said desired transmission time interval, said base station including addition means for multiplexing said paging signal on an FM radio broadcasting signal to generate an FM multiplex signal, and transmission means for frequency-modulating said FM multiplex signal; and a plurality of selective calling receivers including said target terminal for receiving said paging signal and for informing said user of said paging call placed by said calling party, wherein said target wireless terminal includes:

display means for displaying said specific information included in said paging signal and a reception time when said paging signal is first received at a first time, mode selection means operable by said user for selectively setting whether said reception time displayed on said display means is to be updated if said paging signal is received again after said first time, and control means for controlling said display means to update said reception time in accordance with said mode selection means setting, wherein said control means controls said display means to continuously display said reception time of said first time at which said paging signal was first received when said mode selection means has been set at a setting that said reception time is not to be updated, and said control means controls said display means to display a mark representing a duplicated reception when said paging signal is received again after said first time.

2. The selective calling communication system according to claim 1, wherein said specific information includes one of a terminal number of said target wireless terminal and a message from said calling party.

3. The selective calling communication system according to claim 1, wherein said base station includes paging signal generation means for outputting said paging signal said desired number of transmission times at said desired transmission time interval.

4. The selective calling communication system according to claim 2, wherein said base station includes transmission means for frequency-modulating said paging signal.

5. A selective calling receiver for receiving a paging signal transmitted from a base station and for informing a user of a call placed by a calling party, comprising:

display means for displaying specific information included in said paging signal and a reception time when said paging signal is received at a first time;

mode selection means operable by said user for selectively setting whether said reception time displayed on said display means is to be updated if said paging signal is received again after said first time; and control means for controlling said display means to update said reception time on said display means in accordance with said mode selection means setting, wherein said control means controls said display means to continuously display said reception time of said first time at which said paging signal was first received when said mode selection means has been set at a setting that said reception time is not to be updated, and said control means controls said display means to display a mark representing a duplicated reception when said paging signal is received again after said first time.

* * * * *